United States Patent [19]

Okuda et al.

[11] 3,925,555

[45] *Dec. 9, 1975

[54] METHOD OF CONTROLLING MITES USING CHLOROMETHANESULFONAMIDE

[75] Inventors: Itsuki Okuda, Shimizu; Hiroshi Shinohara; Haruki Ogawa, both of Shizuoka; Hideo Itoh, Shimizu, all of Japan

[73] Assignee: Kumiai Chemical Industry Co,, Tokyo, Japan

[ * ] Notice: The portion of the term of this patent subsequent to Mar. 5, 1991, has been disclaimed.

[22] Filed: Dec. 10, 1973

[21] Appl. No.: 423,198

Related U.S. Application Data

[63] Continuation-in-part of Ser. No. 341,367, March 15, 1973, Pat. No. 3,795,743, which is a continuation of Ser. No. 13,204, Feb. 20, 1970, abandoned.

[52] U.S. Cl............................ 424/321; 424/DIG. 8
[51] Int. Cl.².......................................... A01N 9/16
[58] Field of Search...................... 424/DIG. 8, 321; 260/556 A

[56] References Cited
UNITED STATES PATENTS 3,795,743    3/1974    Okuda et al. ...................... 424/321

OTHER PUBLICATIONS

El-Hewehi et al. J. Prakt. Chem. 16 No. 5–6, pp. 297–336 (1962).

*Primary Examiner*—Albert T. Meyers
*Assistant Examiner*—Allen J. Robinson
*Attorney, Agent, or Firm*—Stevens, Davis, Miller & Mosher

[57] ABSTRACT

Mites are combatted by spreading chloromethanesulfonamide in a concentration of more than 250 ppm in an amount of 50 g to 4 kg per 10 ares on plants to be protected from mites.

2 Claims, No Drawings

METHOD OF CONTROLLING MITES USING CHLOROMETHANESULFONAMIDE

This application is a continuation-in-part of application Ser. No. 341,367 filed Mar. 15, 1973 now U.S. Pat. No. 3,795,743, which is a continuation application of application Ser. No. 13,204, filed Feb. 20, 1970.

The present invention relates to a systemic miticide containing chloromethanesulfonamide as an active ingredient and a method for controlling mites very effectively, without causing phytotoxicity and saving labor by spreading chloromethanesulfonamide on plants such as vegetables, fruit trees and the like or soil surfaces or mixing the miticide with soil or spraying a solution dissolved in an appropriate amount of water.

Most commercially available miticides kill mites on contact after spreading them but for this purpose they must be spread throughout the area where mites exist and such a means is very laborious.

The present inventors have found that although the compound to be used in the present invention is low in contact miticidal activity, it shows a high systemic miticidal activity by applying it on leaves or roots. Namely, the compound to be used in the present invention penetrates and transfers into the plant system and consequently mites existing on areas not directly spread can be killed and even if there are some areas where the miticide is incompletely sprayed, the miticidal activity can be satisfactorily attained.

Most of the conventional miticides must be applied directly on the area where mites exist and therefore it is very laborious to spray the miticides evenly and throughout such an area.

However, according to the method for applying the systemic miticide of this invention, it is possible to apply the miticide conveniently and, further since the compound is water soluble, the miticide can be easily absorbed from plants and roots and transfers throughout the plant to develop the miticidal activity, so that there is no fear of unevenness as in a spreading agent. Accordingly, both labor and time can be saved and the use of this compound is very advantageous.

In order that chloromethanesulfonamide is used as a systemic miticide, the compound is mixed with an inert carrier (diluent), if necessary, an adjuvant to form into solution, granule, wettable powder, emulsifiable concentrate or dust, which is directly spread on plants or diluted into a proper concentration and then applied. In addition it is possible to apply the miticide in a hole to be planted prior to planting or a binding treatment, plant stem coating or a plant stem injecting treatment and the like can be made.

The term "carrier" used herein means vehicle to be used for carrying the active ingredient to a desired area, which may be either solid or liquid.

As the solid carrier, for example, use may be made of various clays, pyrophillite, talc, bentonite, white carbon, kaolin, diatomaceous earth, silica and vermiculite.

As the liquid carrier, for example, use may be made of water, alcohol, acetone, cyclohexanone, fatty acid and fatty acid ester.

As the adjuvant, use may be made of conventional surfactants, such as spreading agent, emulsifier, sticker and wetting agent, to be used for formulating pesticides, for example, polyoxyethylene alkylaryl ether, polyvinyl alcohol, polyoxyethylenesorbitan monooleate, alkyldimethylbenzylammonium chloride, alkylbenzenesulfonate, ligninsulfonate, sulfuric acid ester of a higher alcohol and the like.

In general, pesticides must be formed into a formulation suitable for spreading by adding a carrier, such as a solid carrier or a liquid carrier, but since the compound of the present invention is easily soluble in water, this compound may be spread directly in an aqueous solution.

The compound of this invention is hardly decomposed by ultraviolet ray, and therefore even if the compound is spread on the soil surface, the compound is stable. The compound is prepared from chloromethanesulfonyl chloride and ammonia, and is a white or pale yellow prism crystal having a melting point of 70° – 73°C and is soluble in water or water-soluble solvents, such as alcohol and the like.

When the compound of this invention is used together with ammonium chloride, which is by-produced in the preparation of the compound without separation, the miticidal activity is further improved.

In addition to the by-produced ammonium chloride, the miticidal activity can also be improved by using the compound together with fertilizers, for example, nitrogen fertilizers, such as, urea, ammonium sulfate, ammonium nitrate; calcium superphosphate, potassium phosphate, potassium chloride, potassium nitrate and the like or the composite fertilizers thereof.

The mixture ratio of this compound to the fertilizer, when both activities of fertilizer and miticide are aimed at, is, for example, urea of 5 to 30 kg and chloromethanesulfonamide of 0.5 to 8 kg per 10 ares and when only miticidal activity is aimed at, is urea of 0.5 to 3 kg and 0.5 to 8 kg of chloromethanesulfonamide per 10 ares.

The merits attained by mixing with the fertilizer in this manner are as follows:

1. Whenever such a mixture is applied to cultivating field or forest as an initial or supplemental manure, mites can be combatted. Furthermore, for only the purpose of prevention of mites, such a purpose can be accomplished by decreasing the amount of fertilizer. Accordingly, the heretofore complicated and difficult technique and labor for the prevention can be considerably omitted.

2. The handling in the application is simple and safe, that is, it is merely necessary to effect cultivation or soil covering after applying the mixture over the whole surface of the field to be treated and in some case, the effect can be developed fully even if the soil covering or cultivation is not carried out.

3. Since the use of water is not required, the mixture is convenient for upland or forest in highland, inclined field or hill where the use of water is inconvenient.

4. When the mixture is applied in soil, it absorbs gradually water therein and the granules are collapsed and therefore the mixture is absorbed favorably from roots and the activity appears rapidly and the effect enhances. The collapse needs a long time and consequently the activity continues for a long period of time.

5. Chloromethanesulfonamide prevents nitrification and the effect of nitrogen continues for a long period of time and further the miticidal activity can be increased.

6. No phytotoxicity appears against various useful plants.

7. Chloromethanesulfonamide permeates and transfers in the plant and reaches every part of the plant and accordingly any natural enemy is not damaged.

8. Ammonium chloride by-produced in the preparation of chloromethanesulfonamide is not necessary to be separated, so that the use of chloromethanesulfonamide is economic.

9. Particularly, chloromethanesulfonamide is easily blended with urea and therefore the formulation is easy and further the strength of the obtained granule is high.

10. Chloromethanesulfonamide has a low toxicity, and further it is applied directly to soil. Consequently, the compound can be used safely without public nuisance.

The oral toxicity $LD_{50}$ of the compound of this invention against male rats is about 400 mg/kg. Furthermore, the compound has no phytotoxicity.

When chloromethanesulfonamide is sprayed on plants, the concentration of the active ingredient is more than 250 ppm and the dose is 50 g – 4 kg per 10 ares. For example, when 10 year old citrus is sprayed, the most preferable concentration is 800 ppm and the amount is 1 kg per 10 ares and a sprinkler spreading is preferable. When this compound is used for treating soil, the dose is 500 g – 8 kg per 10 ares.

The following examples are given in illustration of this invention, but the ratio of the effective ingredient to the additives can be varied in a broad range. In the examples, "%" means percent by weight.

EXAMPLE 1

Wettable powder

80% of chloromethanesulfonamide, 1% of sodium dodecylbenzenesulfonate, 10% of silicon dioxide and 9% of diatomaceous earth were mixed and milled to prepare a wettable powder, which was suspended in water and then used.

EXAMPLE 2

Wettable powder

50% of chloromethanesulfonamide, 2% of sodium dodecylsulfate, 2% of polyvinyl alcohol and 46% of a mixture of white carbon and diatomaceous earth were mixed and milled to prepare a wettable powder, which was suspended in water and then used.

EXAMPLE 3

Emulsifiable concentrate

20% of chloromethanesulfonamide, 65% of xylene and 15% of an emulsifier sold by Toho Chemical Industry Co., Ltd. under the Trademark Sorpol (a mixture of polyoxyethylene alkylaryl ether, polyoxyethylene fatty acid ester and alkylaryl sulfonate) were mixed and dissolved to obtain an emulsifiable concentrate, which was diluted with water and then sprayed.

EXAMPLE 4

Dust

3% of chloromethanesulfonamide, 30% of talc and 67% of kaolin were mixed and milled to form a dust, which was spread.

EXAMPLE 5

Granule

Into a granulator were charged 90% of powdery urea, and then 10% of melted chloromethanesulfonamide were added to the powdery urea dropwise, while rotating the granulator, to prepare a granular formulation.

EXAMPLE 6

Aqueous solution

A mixture of 30% of chloromethanesulfonamide and 10% of urea was dissolved into 60% of water to prepare an aqueous solution.

The miticidal activity of the compound according to the present invention will be explained with the following experimental examples.

EXPERIMENTAL EXAMPLE 1

Test for miticidal activity on citrus red mite.

Citrus red mites were put on a young summer orange plant planted in a pot having a diameter of 12 cm in a greenhouse.

The wettable powder prepared in Example 2 was diluted with water to prepare a suspension containing the compound of this invention in a concentration of 500 ppm. The suspension was sprayed on the summer orange plant in an amount of 30 ml per 1 pot by means of a spray gun. The number of living mites after the spraying of the suspension was determined to obtain a result as shown in the following Table 1.

Table 1

| Active ingredient | Concentration (ppm) | Number of mites before spraying | Number of living mites after spraying | | | | | |
|---|---|---|---|---|---|---|---|---|
| | | | 2 days | 4 days | 9 days | 13 days | 17 days | 19 days |
| Chloromethanesulfonamide (present invention) | 500 | 114 | 0 | 0 | 1 | 0 | 4 | 29 |
| Galecron* (control) | 500 | 108 | 0 | 0 | 0 | 0 | 15 | 60 |
| Non-treatment | — | 159 | 219 | 222 | 129 | 96 | 252 | 291 |

*Trademark of N'-(2-methyl-4-chlorophenyl)-N,N-dimethylformamidine sold by Ciba Geigy AG.

EXPERIMENTAL EXAMPLE 2

Field test for miticidal activity on citrus red mite.

Citrus red mites were put on a two year old young summer orange plant.

The wettable powder prepared in Example 2 was diluted with water to prepare a suspension having a predetermined concentration of the active ingredient, and the suspension was sprayed in an amount of 100 ml per 1 plant. The number of living mites per 50 leaves of 1 plant after the spraying was determined to obtain a result as shown in the following Table 2.

Table 2

| Active ingredient | Concentration (ppm) | Number of mites before spraying | Number of living mites after spraying | | | | | |
|---|---|---|---|---|---|---|---|---|
| | | | 2 days | 7 days | 13 days | 20 days | 27 days | 35 days |
| Chloromethane-sulfonamide (present invention) | 250 | 368 | 36 | 0 | 0 | 0 | 0 | 0 |
| Morestan* (control) | 250 | 245 | 4 | 1 | 0 | 0 | 0 | 0 |
| Non-treatment | — | 386 | 411 | 302 | 89 | 61 | 28 | 22 |

*Trademark of 6-methyl-2-oxa-1,3-dithiolo (4,5-b)-quinoxaline sold by Bayer AG.

EXPERIMENTAL EXAMPLE 3

Five year old young summer orange plants infested with citrus red mites were sprayed with the sample compounds in the concentrations as shown in the following Table 3 by means of a one liter of small hand spray in an amount of 600 l per 10 ares. Each sample compound was tested on 20 leaves per 1 plant with respect to 5 plants and the number of living mites was determined before spraying and 2, 7, 15, 22 and 28 days after spraying to obtain the results as shown in the following Table 3. The results are the total number of the living mites on 100 leaves of 5 plants for each compound zone.

One test zone was 144 m² and 101 l (711 l/1,000 m²) of the solution of the concentration as shown in the following Table 4 was sprayed. The number of living female adults on 40 leaves of each plant was determined with respect to 5 plants previously selected in the test zone to obtain the results as shown in the following Table 4. The results show an average value per one plant.

Table 4

| Active ingredient | Concentration (ppm) | Number of mites before spraying | Number of living mites after spraying | | | | |
|---|---|---|---|---|---|---|---|
| | | | 3 days | 11 days | 20 days | 31 days | 41 days |
| ClCH$_2$SO$_2$NH$_2$ | 800 | 80 | 0 | 0 | 4 | 2 | 4 |
| " | 500 | 120 | 1 | 2 | 10 | 9 | 18 |
| Morestan 25% W.P. | 250 | 87 | 5 | 3 | 3 | 44 | 254 |
| Non-treatment | — | 82 | 231 | 235 | 304 | 498 | 512 |

Note:
W.P.: Wettable powder.

EXPERIMENTAL EXAMPLE 5

This test was made in the same manner as described in Experimental Example 4 with respect to citrus red mites. The test results are shown in the following Table 5.

Table 3

| Active ingredient | Concentration (ppm) | Number of mites before spraying | Number of living mites after spraying | | | | |
|---|---|---|---|---|---|---|---|
| | | | 2 days | 7 days | 15 days | 22 days | 28 days |
| ClCH$_2$SO$_2$NH$_2$ | 1,000 | 92 | 0 | 0 | 1 | 0 | 2 |
| ClCH$_2$SO$_2$NH—C$_6$H$_4$—CH$_3$  | " | 40 | 37 | 73 | 79 | 108 | 112 |
| ClCH$_2$SO$_2$NH—C$_6$H$_4$—Cl  | " | 81 | 51 | 44 | 45 | 75 | 71 |
| ClCH$_2$SO$_2$NH—C$_6$H$_2$Cl$_3$  | " | 96 | 28 | 80 | 30 | 20 | 39 |
| Morestan | 250 | 88 | 7 | 5 | 3 | 44 | 131 |
| Non-treatment | — | 51 | 104 | 253 | 215 | 150 | 123 |

EXPERIMENTAL EXAMPLE 4

The sample compound was sprayed by means of a sprinkler on 15 year old citrus Unshu garden infested with citrus red mites.

Table 5

| Active ingredient | Concentration (ppm) | Number of mites before spraying | Number of living mites after spraying | | | |
|---|---|---|---|---|---|---|
| | | | 4 days | 11 days | 21 days | 43 days |
| ClCH$_2$SO$_2$NH$_2$ | 800 | 252 | 0 | 0 | 0 | 9 |
| " | 500 | 372 | 0 | 4 | 5 | 40 |
| Morestan 25% W.P. | 250 | 429 | 14 | 17 | 28 | 112 |
| Non-treatment | — | 86 | 156 | 390 | 337 | 324 |

EXPERIMENTAL EXAMPLE 6

13 year old citrus Unshu garden infested with citrus red mites was sprayed by a motor sprayer.

The test zone was 225 m$^2$ and the test solution was 135 l (600 l/1,000 m$^2$) and the number of the female adults was determined with respect to 40 leaves of each of five plants.

| Active ingredient | Concentration (ppm) | Number of mites before spraying | Number of living mites after spraying | | | |
|---|---|---|---|---|---|---|
| | | | 4 days | 11 days | 21 days | 43 days |
| ClCH$_2$SO$_2$NH$_2$ | 800 | 258 | 0 | 0 | 0 | 0 |
| Morestan 25% W.P. | 250 | 475 | 5 | 11 | 8 | 55 |
| Kelthene (2,2,2-trichloro-1,1-bis(p-chlorophenyl)ethanol) 40% E.C. | 400 | 382 | 0 | 63 | 24 | 39 |
| Non-treatment | — | 171 | 312 | 780 | 550 | 246 |

Note:
E.C.: emulsifiable concentrate.

What is claimed is:

1. A method for killing mites, which comprises spraying a solution containing 250–1000 ppm of chloromethanesulfonamide on plants infested by mites.

2. The method of claim 1, wherein the spraying is effected by a sprinkler.

* * * * *